United States Patent Office 3,348,613
Patented Oct. 24, 1967

3,348,613
NOVEL ACIDIZING COMPOSITION
AND METHOD
Riyad R. Irani, St. Louis, Mo., assignor to Monsanto Company, St. Louis, Mo., a corporation of Delaware
No Drawing. Filed May 19, 1965, Ser. No. 457,181
15 Claims. (Cl. 166—42)

ABSTRACT OF THE DISCLOSURE

An acidizing fluid is described containing, as an inhibiting agent, an alkylene diphosphonic acid or a salt thereof for use in the acidizing of wells and in other acidizing operations where iron and like substances are likely to be encountered as well as a process for using the acidizing fluid.

---

This invention relates generally to novel acidizing fluids and to the use of these fluids in acidizing operations where iron and like substances are likely to be encountered. More particularly, this invention relates to an acidizing fluid containing an inhibiting agent and to a method of using the acidizing fluid containing such agent in the acidizing of wells and other acidizing operations.

In acidizing operations performed in oil, gas, brine or water wells and other instances where calcareous deposits containing iron salts or oxides and like substances are contacted by an acidic solution, such as the commonly employed hydrochloric acid, it is customary to use a sequestering agent in the solution in order to prevent or minimize iron impurities from interferring with the intended function of the acidic solution. Whenever such formations are acidized the acid-soluble iron compounds are at first dissolved by the acid, but such compounds remain dissolved in the acid solution only as long as the pH value is less than that at which they are normally precipitated. As the acid solution continues to act upon the calcareous deposits, the pH value of the solution increases to about 4 to 5. The iron compounds being to precipitate at pH values of about 3 to 4 and are precipitated when the pH is about 5. Thus, the acid solution when spent can no longer retain the iron in solution and the resulting iron precipitates oftentimes interfere with the acidizing operation by becoming localized and objectionably plugging, clogging or otherwise obstructing the pore spaces and other openings providing fluid passageways in the well strata.

Various sequestering agents for iron and like substances have heretofore been proposed for use in acidic solutions. However, it should be noted that not all sequestering agents are suitable for such use and some may even be detrimental and, thus, precipitate the iron-containing impurities during the acidizing operation. This is due to the well-known pH sensitivity of the various types of sequestering agents toward particular metallic ions. In particular, well-known sequestering agents, such as sodium tripolyphosphate and the aminocarboxylic acids are, for various reasons, not suitable for use in sequestering iron and like impurities in highly acidic solutions. U.S. Patent 3,142,335 discloses a sequestering agent, which is an admixture of acetic acid and citric acid, as being particularly effective in wells having high iron content and in preventing the redeposition or precipitation of iron deposits in concentrated amounts at locations near the face of the well strata. As can be appreciated, an inhibiting agent which is effective in inhibiting precipitation of iron in an acidizing fluid and which is more effective than the combination of acetic acid and citric acid in acidizing fluids used in treating wells containing iron and like substances would represent an advancement in this art.

An object of this invention is to provide an acidizing fluid containing an inhibiting agent.

A still further object of this invention is to provide a method of using an acidizing fluid containing an inhibiting agent in the acidizing of wells and other acidizing operations where iron and like substances are likely to be encountered.

Other objects will become apparent from the detailed description and the claims.

It has been found that alkylenediphosphonic acids, or the salts thereof, said acids being of the following formula:

(I)

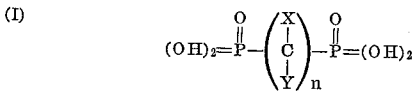

wherein $n$ is an integer from 1–10, X represents hydrogen or lower alkyl (1–4 carbon atoms) and Y represents hydrogen, hydroxyl or lower alkyl (1–4 carbon atoms), are effective in acidizing fluids as inhibiting agents for iron and like substances, as will be more fully discussed hereinafter.

Compounds illustrative of alkylenediphosphonic acids include the following:

(1) methylenediphosphonic acid, $$(OH)_2(O)PCH_2P(O)(OH)_2$$

(2) ethylidenediphosphonic acid, $$(OH)_2(O)PCH(CH_3)P(O)(OH)_2$$

(3) isopropylidenediphosphonic acid, $$(OH)_2(O)PC(CH_2CH_3)P(O)(OH)_2$$

(4) 1 hydroxy, ethylidenediphosphonic acid, $$(OH)_2(O)PC(OH)(CH_3)P(O)(OH)_2$$

(5) hexamethylenediphosphonic acid, $$(OH)_2(O)PCH_2(CH_2)_4CH_2P(O)(OH)_2$$

(6) trimethylenediphosphonic acid, $$(OH)_2(O)P(CH_2)_3P(O)(OH)_2$$

(7) decamethylenediphosphonic acid, $$(OH)_2(O)P(CH_2)_{10}P(O)(OH)_2$$

(8) 1-hydroxy, propylidenediphosphonic acid, $$(OH)_2(O)PC(OH)(CH_2CH_3)P(O)(OH)_2$$

(9) 1,6-dihydroxy, 1,6-dimethyl, hexamethylenediphosphonic acid,
$(OH)_2(O)PC(CH_3)(OH)(CH_2)_4C(CH_3)(OH)P(O)(OH)_2$

(10) 1,4-dihydroxy, 1,4-diethyl, tetramethylenediphosphonic acid,
$(OH)_2(O)PC(C_2H_5)(OH)(CH_2)_2C(C_2H_5)(OH)P(O)(OH)_2$

(11) 1,3-dihydroxy, 1,3-dipropyl, trimethylenediphosphonic acid,
$(OH)_2(O)PC(C_3H_7)(OH)(CH_2)C(C_3H_7)(OH)P(O)(OH)_2$

(12) 1,4-dibutyl, tetramethylenediphosphonic acid,
$(OH)_2(O)PCH(C_4H_9)(CH_2)_2CH(C_4H_9)P(O)(OH)_2$

(13) dihydroxy, diethyl, ethylenediphosphonic acid,
$(OH)_2(O)PC(OH)(C_2H_5)C(OH)(C_2H_5)P(O)(OH)_2$

(14) tetrabutyl, butylenediphosphonic acid,
$(OH)_2(O)P[CH(C_4H_9)]_4P(O)(OH)_2$

(15) 4-hydroxy, 6-ethyl, hexamethylenediphosphonic acid,
$(OH)_2(O)PCH_2CH_2CH_2CH(OH)CH_2CH(C_2H_5)P(O)(OH)_2$ Alkylenediphosphonic acids and their salts may be prepared by various means, one of which comprises as a first step the preparation of the corresponding ester by the following general reactions:

(1) For the alkylidenediphosphonic acids and their salts where $n>1$.

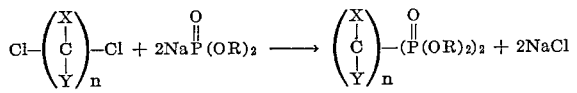

(2) For the alkylidenediphosphonic acids and their salts where $n=1$.

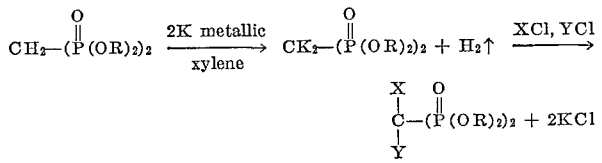

(3) For the alkylenediphosphonic acids and their salts

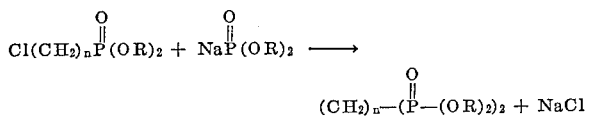

(4) For the 1 hydroxy, alkylenediphosphonic acids and their salts.

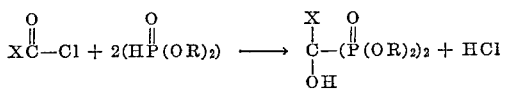

wherein $n$, X and Y are the same as the foregoing general formula and R represents an alkyl group.

The free alkylenediphosphonic acids and their salts may be prepared by hydrolysis of the ester using strong mineral acids such as hydrochloric acid and the like.

The lower alkylidenediphosphonic acids and the water-soluble salts thereof, said acids being of the following formula:

(II)
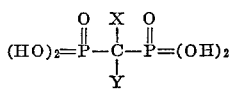

wherein X represents hydrogen or lower alkyl (1-4 carbon atoms) and Y represents hydrogen, hydroxyl or lower alkyl (1-4 carbon atoms), are preferred as inhibiting agents in the present invention.

Compounds illustrative of lower alkylidenediphosphonic acids include the following:
(1) methylenediphosphonic acid,
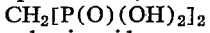
(2) ethylidenediphosphonic acid,
(3) isopropylidenediphosphonic acid,
(4) 1-hydroxy, ethylidenediphosphonic acid,
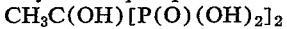
(5) 1-hydroxy, butylidenediphosphonic acid,

Although in general, any water-soluble salt of the alkylenediphosphonic acids may be employed, the sodium salts are preferred, and, in particular, the di-, tri- and tetrasodium salt; however, other alkali metal salts, such as potassium, lithium, and the like, as well as mixtures of the alkali metal salts, may be substituted therefor. In addition, any water-soluble salt, such as the ammonium salts and the amine salts, which exhibit the characteristics of the alkali metal salts may be used to practice the invention. In particular, amine salts prepared from low molecular weight amines, i.e., having a molecular weight below about 300, and more particularly the alkyl amines, alkylene amines and alkanol amines containing not more than 2 amine groups, such as, ethyl amine, diethylamine, propylamine, propylenediamine, hexylamine, 2-ethyl hexylamine, N-butylethanol amine, triethanol amine and the like, are the preferred amine salts.

The acid component of the acidizing fluid of the present invention, in general, is hydrochloric acid of any concentration although hydrochloric acid of greater than 1% by weight HCl is preferred since this strength solution is usually the most dilute concentration conventionally used in acidizing operations. Since the acidizing fluid commonly used in acidizing wells contains from about 5 to 25% by weight HCl with 15% being most generally used, such concentrations are preferred. However, still more concentrated solutions containing hydrochloric acid can be used in some instances and particularly if such is diluted to more desired concentrations prior to or during the application in the acidizing operation. Additionally, minor amounts, i.e., amounts less than 50% by weight of the acid component, of other strong mineral acids, such as sulfuric acid, nitric acid, phosphoric acid and the like can be used, in some cases, in combination with hydrochloric acid.

In general, any effective inhibiting amount, that is, any amount of the inhibiting agent which inhibits the precipitation of iron deposits in the acidizing fluid can be used and, although such amounts vary with, inter alia, acid strength, amount of iron in the deposits and the like, usually amounts on a weight ratio basis of inhibiting agent to iron of greater than about 0.05:1 are sufficient. It is preferred that amounts greater than about 1:1 on a weight ratio basis not be used since such amounts usually tend to precipitate the iron deposits rather than inhibit their precipitation. Usually, for concentrations of iron commonly encountered in acidizing operations, such as from about 1,000 to about 20,000 p.p.m. amounts of the inhibiting agent of the present invention of from about 5 pounds to about 90 pounds per 1,000 gallons of a 15% by weight hydrochloric acid solution are sufficient with about 30 to about 70 pounds being preferred.

While the manner of formulating or admixing the acidizing fluid is not believed critical, one method which may at times prove advantageous is to first add the inhibiting agent to a predetermined quantity of water which is sufficient to dilute the concentrated hydrochloric acid to a desired strength for its ultimate use. To this water is added the concentrated hydrochloric acid in such a manner as, for example, by agitation, to provide a uniform or homogeneous fluid or, if desired, the inhibiting agent can be added to the concentrated hydrochloric acid again in such a manner as, for example, by agitation, to provide a uniform or homogeneous mixture and thereafter diluting the mixture with water to the desired strength prior to or at the time of application in the acidizing operation. When any of the hereinafter described additional ingredients are to be included in the acidizing fluid such may be added in any convenient manner in accordance with conventional practice. For example, wetting agents, corrosion inhibitors, buffering agents and the like may either be premixed with the hydrochloric acid or with the inhibiting agent or an aqueous solution thereof prior to being formulated into the acidizing fluid of the desired strength which is to be utilized in the acidizing operation. As can be appreciated the amounts of the additional ingredients as well as the inhibiting agent and the strength of the hydrochloric acid can be varied to obtain optimum results for a given acidizing operation. Such additional additives as well as amounts are dependent upon such factors as the relative costs of the ingredients, the type of acidizing operation involved and the amount of iron deposits likely to be encountered in the acidizing operation.

While an acidizing fluid in accordance with this invention need contain only hydrochloric acid and the alkylene diphosphonic acids or their salts, it will be appreciated that the incorporation into the fluid of additional ingredients commonly used in conventional amounts, such as, below about 5% by weight of the acidizing fluid, in such fluids, such as, buffering agents, wetting agents, penetraters, surface tension reducers, intensifiers and corrosion inhibitors are contemplated as being within the invention.

The acidizing fluid, that is, the solution containing hydrochloric acid and the inhibiting agent of the present invention, with or without one or more of the aforesaid types of additional ingredients can be used to increase or restore the permeability of a zone or formation by being introduced into the earth formation containing the calcareous deposits via an injection into the well in any convenient manner as understood in the acidizing art. After the injection of the fluid into the deposits, the fluid attacks the calcareous deposits with such usually being completed within 3 or 4 hours of the injection and thereafter the spent fluid may be withdrawn by pumping, bailing, or allowing the well to flow. Additionally, when the well is a disposal or injection well, the acidizing fluid can be introduced into the well in any convenient manner as understood in this art, with the acid contacting the structures or strata to be treated and thereafter the spent fluid is displaced into the structure or strata by a displacing fluid, usually water.

In order to illustrate the advantageous use of the acidizing fluid of the present invention, tests were carried out comparing an acidizing fluid containing a mixture of glacial acetic acid and citric acid (as previously mentioned such a mixture was reported to be an effective sequestering agent in acidizing fluids) with varying acidizing fluids of the present invention.

The test procedure used was to prepare samples of 15% hydrochloric acid solution containing the additive to be tested and concentrations of iron (Fe$^{+++}$) of about 10,000 p.p.m., by adding FeCl$_3$ thereto, in solution were prepared and allowed to stand in contact with excess limestone in covered containers until precipitation occurred. In all tests the reaction of HCl with the limestone was completed within about 20 minutes. The times required for initial precipitation of iron hydroxide (FeOH$_3$) from the various solutions were recorded. Additionally, the concentration of iron in the solution after various periods of time was determined by centrifuging and filtering the various solutions and analyzing the clear filtrate colormetrically using the orthophenanthroline method.

TABLE 1

| Additive per 1,000 Gallons of 15% HCl Solution | Time for Initial Precipitation | Conc. of Iron in Solution After 20 Hours (p.p.m.) | Conc. of Iron in Solution After 28 Days (p.p.m.) |
| --- | --- | --- | --- |
| 1. No additive | <30 min | 1,700 | <100 |
| 2. 50 lbs. citric acid, 10 gal. acetic acid. | 7 hours | 3,600 | 3,600 |
| 3. 30 lbs. HEDP | 3½ hours | 7,100 | 400 |
| 4. 50 lbs. HEDP | 4 hours | 7,200 | 500 |
| 5. 70 lbs. HEDP | 7 hours | 8,100 | 7,400 |

HEDP = 1-hydroxy, ethylidenediphosphonic acid, CH$_3$(OH)C[P(O)(OH)$_2$]$_2$

As can be observed from the above table, the additive of the present invention, 1-hydroxy, ethylidenediphosphonic acid, was much more effective than the sequestering agent combination of citric acid and acetic acid. For the combination of citric acid and acetic acid (2) the time for initial precipitation was 7 hours, as compared to less than 30 minutes for the acidizing fluid containing no additive (1), but after 20 hours, the concentration of iron in solution was reduced to 36 percent of the initial value which is approximately a factor of two greater than the acidizing fluid (1). For acidizing fluids containing an inhibiting agent of the present invention, (3), (4) and (5), the time for initial precipitation ranged from 3½ to 7 hours and after 20 hours the concentration of iron in solution was reduced to from 71% to 81% of the initial value which is a factor of over four greater than the acidizing fluid (1). Additionally, for acidizing fluid (5) 74% of the original iron remained in solution after 28 days compared to 36% for the acidizing fluid containing the sequestering agent combination (2). The ability to maintain higher concentrations of iron in solution for a longer period of time is extremely advantageous for an acidizing operation when more time for flushing the spent acidizing fluid out of the well is desired. Further, it should be noted that amounts of the inhibiting agent of the present invention used in the tests are much less than the amounts of the sequestering agent combination of acetic acid and citric acid used and are much less than required for sequestering or complexing agents to sequester or complex the iron in the acidizing fluid.

In a test carried out according to the hereinbefore described test procedure, except that the iron concentrations in the acidizing fluid were varied as indicated, the following results were obtained.

TABLE 2

| Additive per 1,000 Gallons of 15% HCl Solution | Precipitation Time (hours) vs. Iron Concentration, Parts per Million Iron (III) in HCl Solution | | |
| --- | --- | --- | --- |
| | 8,000 | 10,000 | 12,000 |
| 1. 10 lbs. HEDP | 4½ | 3½ | 3½ |
| 2. 20 lbs. HEDP | 5½ | 4 | 3½ |

HEDP = 1-hydroxy, ethylidenediphosphonic acid, CH$_3$(OH)C[P(O)(OH)$_2$]$_2$

As can be observed from the foregoing table, very small amounts of the inhibiting agent in the acidizing fluid are quite effective in inhibiting the precipitation of iron of varying concentrations which illustrates the advantageous utility of the acidizing fluid of the present invention.

What is claimed is:

1. For use in the acidizing of wells and in other acidizing operations where iron and like substances are likely to be encountered, an acidizing fluid containing hydrochloric acid and effective inhibiting amounts of an inhibiting agent selected from the group consisting of acids having the formula

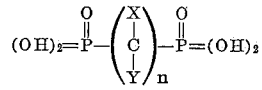

wherein $n$ is an integer from 1 to 10, X is selected from the group consisting of hydrogen and lower alkyl groups and Y is selected from the group consisting of hydrogen, hydroxyl and lower alkyl groups, and their water soluble salts.

2. The acidizing fluid of claim 1, wherein said inhibiting agent is used in amounts of from about 5 to about 90 pounds per 1,000 gallons of said fluid.

3. In an acidizing operation, the step of applying to the structure to be treated an acidizing fluid containing an inhibiting agent as defined in claim 1.

4. In an acidizing operation, the step of applying to the structure to be treated an acidizing fluid containing an inhibiting agent as defined in claim 2.

5. In a well acidizing operation performed to treat a disposal or injection well containing iron and like substances, the steps of introducing into the well an acidizing fluid containing hydrochloric acid and an inhibiting agent as defined in claim 1, causing said acidizing fluid to contact structures in the well to be treated, whereupon the treating acid is permitted to attack substances in the well, and thereafter displacing said acidizing fluid into the well strata.

6. In an acidizing operation performed to treat an oil or gas well or the like to increase or restore the permeability of a zone or formation therein through which fluid is to be conducted during the course of operating the well, the steps of introducing into the well an acidizing fluid containing hydrochloric acid and an inhibiting agent as defined in claim 1, causing said acidizing fluid to contact the zone or formation to be treated, whereupon the treating acid is permitted to attack substances and thereby increase or restore the permeability of said zone or formation, and thereafter removing said acidizing fluid from the treated zone or formation.

7. For use in the acidizing of wells and other acidizing operations where iron and like substances are likely to be encountered, an acidizing fluid containing hydrochloric acid and effective inhibiting amounts of an inhibiting agent selected from the group consisting of acids having the formula

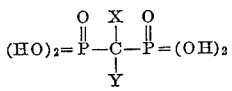

wherein X is selected from the group consisting of hydrogen and lower alkyl groups and Y is selected from the group consisting of hydrogen, hydroxyl and lower alkyl groups, and their water soluble salts.

8. The acidizing fluid of claim 7, wherein the hydrochloric acid is present in concentrations of from about 5 to 25 weight percent and said inhibiting agent is present in amounts of from about 30 to about 70 pounds per 1,000 gallons of said fluid.

9. The acidizing fluid of claim 8, wherein said inhibiting agent is 1-hydroxy, ethylidenediphosphonic acid.

10. In an acidizing operation, the step of applying to the structure to be treated an acidizing fluid containing an inhibiting agent as defined in claim 7.

11. In an acidizing operation, the step of applying to the structure to be treated an acidizing fluid containing hydrochloric acid in concentrations of from about 5 to about 25 weight percent and, as an inhibiting agent, 1-hydroxy, ethylidenediphosphonic acid in amounts of from about 30 to about 70 pounds per 1,000 gallons of said fluid.

12. In a well acidizing operation performed to treat a disposal or injection well containing iron and like substances, the steps of introducing into the well an acidizing fluid containing hydrochloric acid and an inhibiting agent as defined in claim 7, causing said acidizing fluid to contact structures in the well to be treated, whereupon the treating acid is permitted to attack substances in the well, and thereafter displacing said acidizing fluid into the well strata.

13. The process of claim 12, wherein said hydrochloric acid is in concentrations of from about 5 to about 25 weight percent and said inhibiting agent is 1-hydroxy, ethylidenediphosphonic acid present in amounts from about 30 to about 70 pounds per 1,000 gallons of said fluid.

14. In an acidizing operation performed to treat an oil or gas well or the like to increase or restore the permeability of a zone or formation therein through which fluid is to be conducted during the course of operating the well, the steps of introducing into the well an acidizing fluid containing hydrochloric acid and an inhibiting agent as defined in claim 7, causing said acidizing fluid to contact the zone or formation to be treated, whereupon the treating acid is permitted to attack substances and thereby increase or restore the permeability of said zone or formation, and thereafter removing said acidizing fluid from the treated zone or formation.

15. The process of claim 14, wherein said hydrochloric acid is in concentrations of from about 5 to about 25 weight percent and said inhibiting agent is 1-hydroxy, ethylidenediphosphonic acid in amounts from about 30 to about 70 pounds per 1,000 gallons of said fluid.

References Cited

UNITED STATES PATENTS

| | | | |
|---|---|---|---|
| 2,286,794 | 6/1942 | Dickey et al. | 260—500 |
| 3,021,279 | 2/1962 | Scanley | 260—500 |
| 3,142,335 | 7/1964 | Dill et al. | 166—42 X |
| 3,234,124 | 2/1966 | Irani | 210—58 X |
| 3,271,306 | 9/1966 | Capriati et al. | 166—42 X |

FOREIGN PATENTS 1,045,373   12/1958   Germany.

OTHER REFERENCES

Dehydag, Deutsche Hydrierwerke G.m.b.H., "Epoxy-Containing Organic Compounds," Chemical Abstracts, vol. 61, November (1964), p. 12151.

Moedritzer et al.: "Synthesis and Properties of Mono- and Poly (Methylene-Diphosphonic Acid) and Esters," Chemical Abstracts, vol. 57, September (1962), pp. 5949 and 5950.

ERNEST R. PURSER, *Primary Examiner.*

STEPHEN J. NOVOSAD, *Examiner.*